Figure 1:
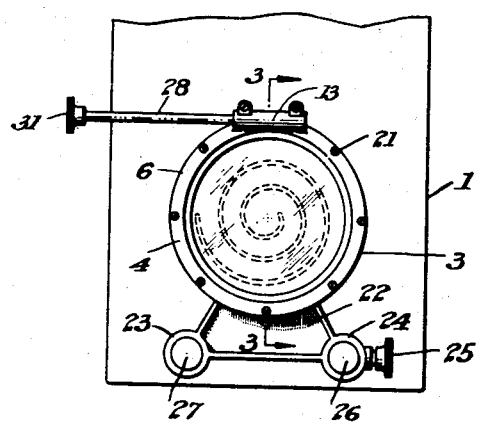

Aug. 13, 1940.  J. B. WALKER  2,211,037

PHOTOGRAPHIC DIFFUSION DEVICE

Filed Jan. 27, 1939  2 Sheets-Sheet 1

INVENTOR:
Joseph B. Walker
BY
ATTORNEY

Aug. 13, 1940.　　　J. B. WALKER　　　2,211,037
PHOTOGRAPHIC DIFFUSION DEVICE
Filed Jan. 27, 1939　　　2 Sheets-Sheet 2

INVENTOR:
Joseph B. Walker
BY
ATTORNEY

Patented Aug. 13, 1940

2,211,037

UNITED STATES PATENT OFFICE 2,211,037

PHOTOGRAPHIC DIFFUSION DEVICE

Joseph B. Walker, Los Angeles, Calif.

Application January 27, 1939, Serial No. 253,127

1 Claim. (Cl. 95—81)

The present invention relates to photographic diffusion devices. The invention is adapted for any type of camera, such as used for either motion pictures or still photography.

The invention has for an object the provision of a diffusion device wherein the direct image of an object may be maintained in sharp focus, the highlights remaining in soft focus.

Another object is the provision of a diffusion device having diffused areas, which areas may be progressively changed to soften highlights.

In the practice of my invention, I have provided several forms of diffusion device adapted to be mounted forwardly of the lens of a camera. The diffusion device has a clear area and other areas are so arranged that a variable diffusion effect may be introduced.

While I am aware that various devices are on the market at the present time for introducing diffusion, still so far as I know, there is no device which can be easily and rapidly actuated to produce any desired effect on a film. For instance, in one embodiment of my invention, I provide two transparent discs, each provided with a continuous spiral groove and which groove may be either frosted, sand-blasted, or the like, or left clear. One transparent member is held fixed and the other is rotatable in such a manner that the spiral groove of one member may overlap the spiral groove of the other, or be moved relative to the other groove to vary the width of the diffusion area. With such a device, I provide a simple mount whereby the diffusion device may be moved relative to the lens and along the axis of said lens. It is, therefore, possible to readily control diffusion both through variation of width in the diffused areas as well as by moving the device forwardly and backwardly relative to the lens.

While it is thought that it is perhaps unnecessary to go into the theory of diffusion, still it is evident in devices of this character that what is actually interposed to cause the diffusion is aberration. The grooves of the diffusion devices bend the light rays in such a manner that a circle is really cast at the plane of the film positioned at the focal point of the lens. It is intended in the use of my invention that the camera lens itself should constitute a well corrected objective and that such aberration as desired is introduced through the use of a diffusing element. My diffusing device may readily operate without the use of auxiliary devices, such as screens, shutters, or the like.

Various other objects of the invention include a device which is simple of structure, inexpensive in cost of manufacture, fool-proof in operation, and adapted to produce superior results.

With the above mentioned objects and others in view, as hereinafter outlined in the specification, the invention consists in the novel and useful provision, formation, construction, association and relative arrangement of parts, members and features, all as shown in certain details in the accompanying drawings, described generally, and more particularly pointed out in the claim.

Figure 2:
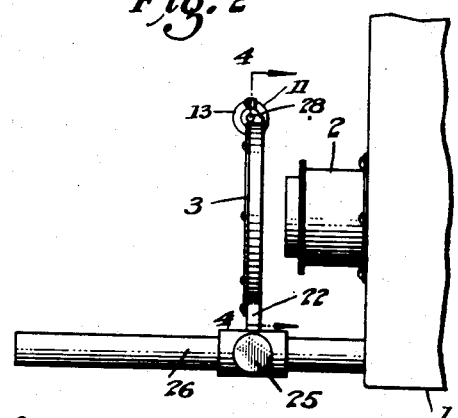
Figure 3:
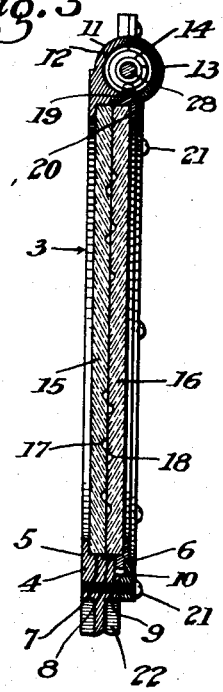
Figure 4:
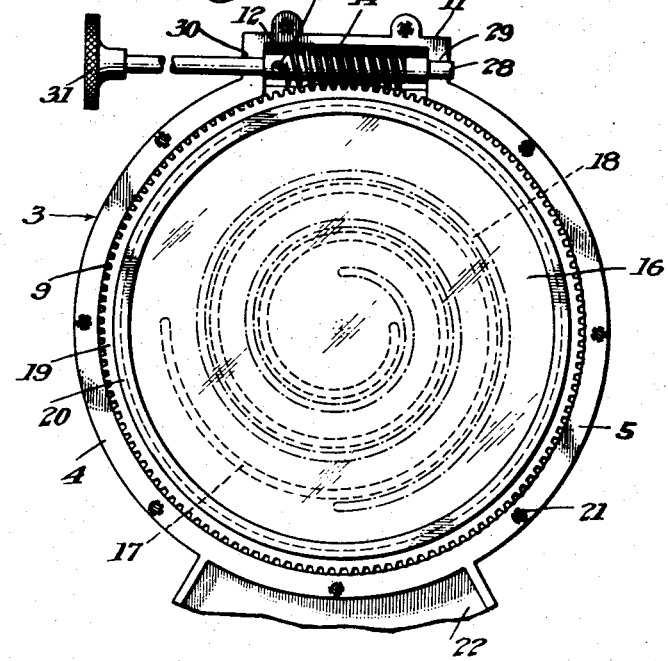
Figure 5:
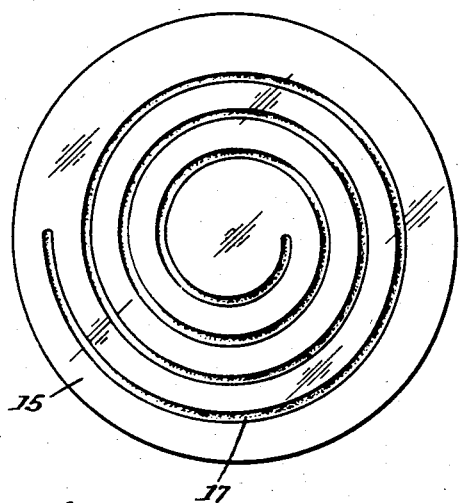
Figure 6:
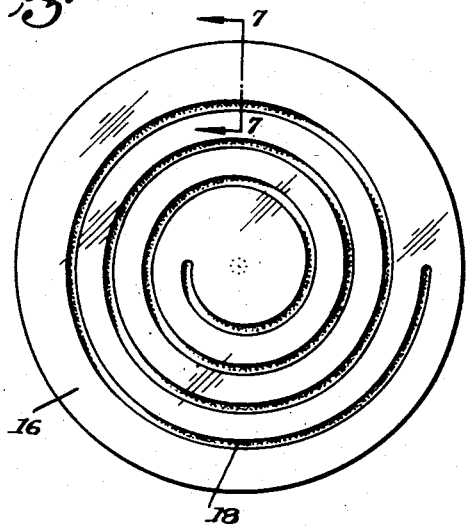
Figure 8:
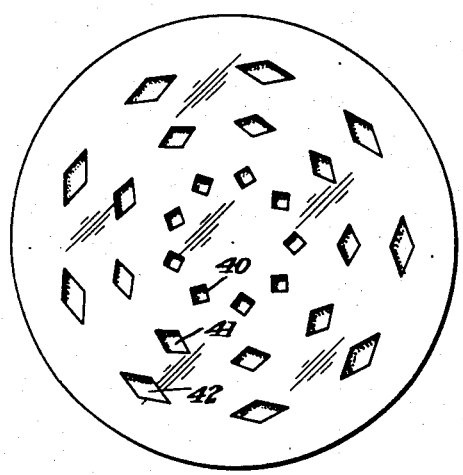
Figure 9:
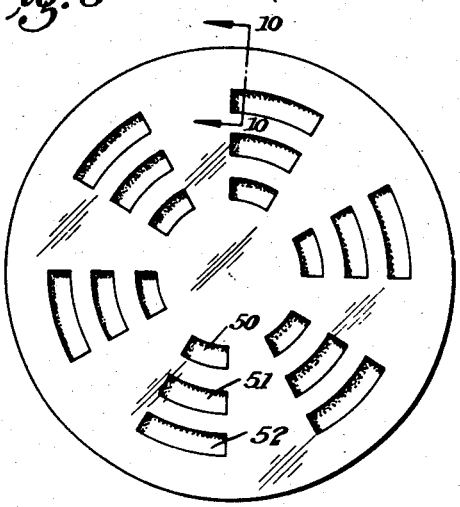
Figure 7:
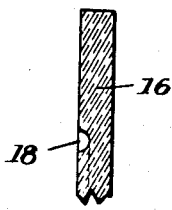
Figure 10:
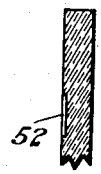

In the drawings:

Figure 1 is a front elevation of one form of diffusion device shown mounted upon arms which in turn are secured to a camera box or casing, Figure 2 is a side elevation of the device shown in Figure 1, Figure 3 is a sectional view on the line 3—3 of Figure 1, and on an enlarged scale, Figure 4 is a view on the line 4—4 of Figure 2 and on an enlarged scale, Figure 5 is a face view of one of the transparent discs showing a continuous spiral groove, Figure 6 is a face view of an element adapted to cooperate with the disc of Figure 5, Figure 7 is a sectional view on the line 7—7 of Figure 6, Figure 8 is a face view of a modified form of disc, the depressions of which are diamond shaped, Figure 9 is a further modified form of the invention, being a face view of a disc having segmental slots, and Figure 10 is a sectional view on the line 10—10 of Figure 9.

Referring now to that form of the invention depicted in Figures 1 to 7, inclusive, I have shown at 1 a camera box which may house various photographic apparatus and be either of the motion picture or still type. As is usual, the camera carries a lens 2. Adapted to be positioned forwardly of the lens is a diffusion device 3. This diffusion device includes a casing 4 formed in two parts 5 and 6 of annular construction. The part 5 is formed with annular grooves 7, 8 and 9, and the part 6 is annularly grooved at 10. The casing part 5 is enlarged at 11 and provided with a half-round groove 12, and the part 6 is enlarged at 13 and also provided with a half round groove, the two half-round grooves when the parts 5 and 6 are cooperating providing a housing for a worm and gear 14.

One of the diffusion discs 15 shown in Figure 5 is placed within the annular groove 7 of the part 5 and the other diffusion disc 16, as shown in Figure 6, is laid thereover in such a manner that the spiral grooves 17 and 18 of said discs are in facing relation (see Figure 3). An annular gear 19 is provided with a right angle flange 20 adapted to have fitted therein the disc 16. The grooves 9 and 10 of the casing parts 5 and 6 provide a way within which the gear tooth portion may be received and guided during rotation thereof. Any suitable means, such as screws 21 received in aligned bores of the two parts of the casing may be provided for holding the casing parts together, and in such a manner that the teeth of the gear 19 will mesh with the teeth of the worm 14 so that a turning of the worm will produce rotation of the gear and the disc 16, the disc 15 remaining stationary. To this end, it is intended that the disc 15 shall be held within its groove by cement or by pressed-fit engagement. The casing part 5 is provided with a bracket 22 terminating in two spaced-apart slide bearings 23 and 24, one of which bearings carries an adjusting screw 25. A pair of spaced arms 26 and 27 extend outwardly from the camera box and the slide bearings are carried thereon, as illustrated in Figure 2.

In order to turn the worm gear, I have provided an elongated shaft 28 passed through bearing portions 29 and 30 of the enlargement, one end of which shank carries a finger-piece 31. The worm gear may be locked to the shank in any approved manner, such as by a set screw 32 to the end that when the finger piece is rotated to rotate the shank, the gear in turn will be rotated in the well understood manner.

In the remaining forms of the invention as depicted in Figures 8 and 9, the same apparatus for mounting the diffusion discs is employed, the difference residing in the diffusion discs. Hence, with that form of the invention shown in Figure 8, two discs would be provided identical in formation, and one surface of each disc would be provided with diamond-shaped grooves of radially varying size, as illustrated at 40, 41 and 42. As before, the two discs are adapted to have their grooved surfaces in facing relationship and the grooves are of like character or configuration as is true for all forms of my invention.

In Figure 9, two discs are provided, both formed with segmental radially related grooves 50, 51, 52.

The spacing between adjacent segmental grooves or diamond-shaped grooves is substantially equal to the arc of a segment. Hence, when two discs are used and one of said discs rotated relative to the other, the grooves of one disc may overlie the plane surface of the other disc and from therebetween a series of concentric circular diffusion areas. It is evident that a turning of one disc relative to the other, in that form of the invention shown in Figure 9, provides what may be termed arithmetical progression so far as the relationship of the grooves of both discs is concerned; for instance, the grooves of both discs may be facing and contiguous or one disc may be turned so as to progress and increase the diffusion areas.

In the form of the invention shown in Figure 8, what may be termed a geometrical progression of diffusion areas results.

The operation, uses and advantages of the invention just described are as follows:

Taking the form of the invention depicted in Figures 1 to 7, inclusive, and turning one of the discs relative to the other will cause the spiral groove of one of the discs to completely overlie and be contiguous to the spiral groove of the other disc, or as indicated by the dotted lines in Figure 1. Rotation of the one disc relative to the other will produce a gradual separation of the grooves to vary the width of the diffusion area.

The form of the discs shown in Figures 8 and 9 does not vary the width of the diffusion area as does that form shown in Figures 1 to 7, but tends to increase the diffusion area or diminish the same by providing transparent areas between the interrupted diffusion grooves. In all instances, the center of the disc is left transparent and is not interferred with, so that the direct image through the diffusion discs is at all times sharp.

I claim:

A diffusion device including a pair of discs, both provided with identical spiral grooves, providing a diffusion area, said discs placed in contiguous relationship, and means for rotating one of said discs to position the spiral groove of said disc in contiguous relationship with the spiral groove of the other disc or progressively out of contiguous relationship to collectively provide a variable diffusion area.

JOSEPH B. WALKER.